United States Patent Office

3,755,597
Patented Aug. 28, 1973

3,755,597
MOSQUITO LARVICIDE COMPOSITIONS
Walter William Abramitis, Downers Grove, Ill., assignor to Akzona, Incorporated, Asheville, N.C.
No Drawing. Continuation-in-part of application Ser. No. 610,748, Jan. 23, 1967. This application Nov. 24, 1969, Ser. No. 879,582
Int. Cl. A01n 9/20
U.S. Cl. 424—304       4 Claims

ABSTRACT OF THE DISCLOSURE

Compositions for killing the larvae of insects comprising an inert organic or aqueous carrier and an amine compound selected from the group consisting of N-(2-cyanoethyl)dodecylamine and long chain aliphatic hydrocarbon diamines, especially N-tallow 1,3-trimethylene diamine.

---

This application is a continuation-in-part of my copending application of same title Ser. No. 610,748 filed Jan. 23, 1967 now abandoned.

The most frequently utilized substances for the control of mosquito larvae are petroleum oils, Paris green, oil emulsions containing pyrethrum extract and DDT (dichlorodiphenyltrichloroethane). Borax (sodium tetraborate), creosote (an oil distillate from wood or other tars consisting chiefly of cresol, oxycresol, methylcresol and other phenols), DDT and benzene hexachloride are frequently used as fly larvicides. Of these substances, DDT is the most widely used mosquito and fly larvicide.

However it now appears that mosquitoes and flies quite readily and rapidly acquire resistance to certain insecticides and larvicides. Tests on the larvae have shown the development of resistance, generally confined to the particular cidal substance tested but significantly also to other substances chemically related to the cidal substances tested, which resistance is carried over to adulthood and to succeeding generations of mosquitoes and flies. For example, malathion (dimethyl dithiophosphate of diethyl mercaptosuccinate) has been used to control culicine mosquito larvae which have acquired resistance to the chlorinated hydrocarbons; but this has led to the emergence of malathion resistant mosquitoes. Further, it appears that house fly larvae are more resistant to the action of DDT than are the adult house flies. Therefore, it is imperative that novel larvicides be developed chemically unrelated to the organochlorines and organophosphates which have proven to be highly effective against the adult insects. This would allow the one group of chemicals to be used against the larvae while the other group is reserved for the adult insects. Thereby larvae exposed to the former group would not acquire a resistance to the second group, and thereby the utility of the organochlorines and organophosphates would be markedly extended as insecticides.

It is further recognized that frequently compounds closely related chemically differ widely in their ability to kill insects and insect larvae. Thus the search for new insecticides and larvicides is largely an empirical one. U.S. Pat. 2,307,775 states that amines are not toxic to adult insects as a class, that few of the class have value for insecticidal purposes and that the few having properties for certain types of insects are quite ineffective for others. This patent then discloses certain specific tertiary amines as having cidal properties against webbing clothes moth and black carpet beetle larvae, which are insects entirely different from flies and mosquitoes in species and insecticidal susceptibility. U.S. Pat. 2,588,428 discloses the use of the reaction product of an aliphatic substituted zinc dithiocarbamate and an amine having at least one hydrogen atom in the amino group as a mosquito larvicide. This is a metallic amine type compound and one would expect larvicidal activity to be attributable to the presence of the zinc.

SUMMARY OF THE INVENTION

This invention relates to insect larvicides. More particularly it relates to larvicides consisting essentially of N-(2-cyanoethyl) dodecylamine and long chain aliphatic hydrocarbon diamines. I have discovered that these compounds are effective insect larvicides when the aliphatic hydrocarbon radical contains from 8 to 22 carbon atoms. The radicals may be saturated or partially unsaturated. These compounds are particularly effective against mosquito and fly larvae.

Therefore it is an object and advantage of this invention to provide a large group of insect larvicides. Another object of this invention is to provide a class of larvicides chemically different from DDT and other organochlorine or organophosphate insecticides, in order that these latter compounds may be reserved for usage against adult insects. A further object is to provide larvicides which are inexpensive, readily formulated and effective in use. Other objects and advantages of my invention will become apparent from the ensuing description and examples.

DESCRIPTION OF THE PREFERRED EMBODIMENTS

In one embodiment of my invention, I combine, with an inert aqueous or organic diluent, an amine compound selected from the group consisting of N-(2-cyanoethyl) dodecylamine and long chain aliphatic hydrocarbon diamines, wherein the hydrocarbon radical is a saturated or partially unsaturated aliphatic hydrocarbon containing from 8 to 22 carbon atoms and the concentration of the amine compound is at least 0.1 part per million parts of diluent by weight. The preferred concentration of the amine compound is from 10 to 20 parts per million parts of diluent, and the upper limits of the amine concentration are not critical. I may use 500 parts of the amine, or slightly more, per million parts of diluent.

Illustrative diamines having utility in the practice of this invention are N-alkyltrimethylene diamines having the structure

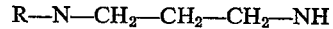

R—N—CH$_2$—CH$_2$—CH$_2$—NH wherein R is an aliphatic hydrocarbon radical having from 8 to 22 carbon atoms. These diamines may be commercially obtained or may be derived from the corresponding chain length primary amine. The primary amine is reacted with acrylonitrile to yield the corresponding chain length cyanoethyl amine which is hydrogenated to the diamine containing both primary and the corresponding long chain aliphatic hydrocarbon secondary amine groups.

The hereinabove described radicals having from 8 to 22 carbon atoms may be saturated or mono-unsaturated straight or branched chain aliphatic hydrocarbon groups, such as octyl, nonyl, N-(C$_7$-C$_9$ sec.-alkyl), dodecyl, tridecyl, tetradecyl, pentadecyl, N-(C$_{11}$-C$_{15}$ sec.-alkyl), hexadecyl, octadecyl, octadecenyl, octadecatrienyl, docosy, eicosy, and mixtures of radicals such as are derived from naturally occurring glycerides such as coconut oil, tallow, soybean oil and the like. Coconut oil contains a mixture of aliphatic hydrocarbon radicals approximately 5% octanoic, 6% n-decanoic, 52% dodecanoic, 19% tetradecanoic, 9% hexadecanoic, 2% octodecanoic, 6% 9-octadecanoic, and 1% 9.12-octadecadienoic. Tallow contains approximately 4% tetradecanoic, 0.5% pentadecylic, 28% hexadecanoic, 1.5% heptadecanoic, 61% octodecanoic, 4% 9-octadecanoic and 1% eicosanoic. Soybean oil averages approximately 0.1% tetradecanoic, 8% hexadecanoic, 4% octodecanoic, 0.6% eicosanoic, 0.1% tetradecenoic, 0.2% hexadecenoic, 28% 9-octadecanoic, 54% 9.12-octadecadienoic, and 5% 9.12.15-octadecatrienoic.

The hereinabove amine and diamines are water soluble and water emulsions of them may be formulated. The amine and diamines are soluble in many organic solvents, including kerosene and other petroleum oils, and organic solutions or oil emulsions of them may be sprayed or otherwise applied to larvae infested areas. My larvicides can also be used in dusting compositions by absorbing the compositions on such substances as talc, clays and diatomaceous earth.

In order to describe my invention fully, several illustrative examples are given hereinafter, but without in any way limiting the invention thereto. When known insecticides are referred to in the examples, they are defined by their common names approved by the Interdepartmental Committee on Pest Control and their chemical name.

EXAMPLE I

Larvicidal action of some of the diamines was evaluated on third instar house fly larvae. Maggots of *Musca domestica*, Linn. house flies were reared by the official CSMA rearing method [1] to the third instar. The third instar larval stage was chosen because it repersents the hardiest larval stage of the house fly and because it is the easiest to manipulate.

The in vitro test procedure consisted of separating the larvae from the rearing medium by placing a portion of like material suspended over a shallow tray by means of a coarse screen. By illuminating the surface of the medium portion, the negatively phototropic larvae were made to the medium upon a loose cotton gauze, burlap or other drop onto the tray, where they were picked up with a pair of forceps and transferred to a test dish. The larvae were protected from mechanical injury due to the forceps by a drop of solder placed on the inner side of one of the prongs to give a gap slightly larger than the average third instar larva. The test dish and exposure area thereof consisted of a small petri dish containing filter paper previously impregnated with a known amount of the amine or diamine. In instances where the compound being evaluated was water insoluble, it was dissolved in a volatile organic solvent, applied to the filter paper, and the solvent was driven off before two ml. of distilled water was added to supply the necessary moisture for the larvae. In instances of water-soluble compounds, two ml. of a solution at the desired concentration was applied to impregnate and to wet the filter paper. Twenty-five third instar larvae were placed into each impregnated test dish and the dish was covered. The larvicidal activity of the compounds was noted after a few hours, after 24 hours and after 48 hours. Approximately 48 hours after the larvae were placed into the impregnated dishes, the number of living and dead larvae were determined. Larval mortality was determined and expressed as $LD_{50}$ and $LD_{95}$ where $LD_{50}$ is the median lethal dosage expressing relative toxicity values for the compounds, i.e., the amount of compound in micrograms per 64 square centimeters required to kill one-half of the sample of fly larvae treated. Four standard insecticides also generally used as larvicides were evaluated for comparison. Results of the evaluation are set forth in Table I.

TABLE I

| | Amount of compound | | | Average percent larval control | Larval death, mg./64 sq.cm. | |
|---|---|---|---|---|---|---|
| | Percent concentration | Mg. 64 sq.cm. | Number of larvae | | $LD_{50}$ | $LD_{95}$ |
| Compound: | | | | | | |
| Borax standard | | 500 | 30 | 100 | 8.4 | 100.0 |
| | | 200 | 30 | 93.3 | | |
| | | 100 | 540 | 93.3 | | |
| | | 10 | 540 | 74.4 | | |
| | | 5 | 200 | 0.0 | | |
| | | 1 | 200 | 0.0 | | |
| Methoxychlor standard (dimethoxydiphenyltrichloroethane) | | 2.5 | 100 | 76.0 | 1.5 | 8.0 |
| | | 1.25 | 100 | 49.0 | | |
| | | 0.625 | 100 | 55.0 | | |
| DDT standard | | 5.0 | 200 | 72.0 | 2.5 | 15.5 |
| | | 2.5 | 200 | 46.0 | | |
| | | 1.25 | 200 | 34.0 | | |
| | | 0.625 | 100 | 23.0 | | |
| Lindane standard (gamma isomer of hexachlorocyclohexane) | | 2.0 | 75 | 97.3 | 0 1. | 0.37 |
| | | 1.0 | 75 | 86.7 | | |
| | | 0.5 | 75 | 97.3 | | |
| | | 0.25 | 75 | 89.3 | | |
| | | 0.125 | 75 | 85.3 | | |
| | | 0.06 | 75 | 1.3 | | |
| Diamines: | | | | | | |
| N-dodecyl-1,3-trimethylene diamine | 5.0 | 100 | 100 | 100 | 1.2 | 4.2 |
| | 1.0 | 20 | 100 | 100 | | |
| | 0.1 | 2 | 100 | 75.0 | | |
| | 0.05 | 1 | 100 | 11.0 | | |
| N-coco-1,3-trimethylene diamine | 5.0 | 100 | 100 | 100 | 6.4 | 10.0 |
| | 1.0 | 20 | 100 | 100 | | |
| | 0.1 | 2 | 100 | 0.0 | | |
| | 0.05 | 1 | 100 | 1.0 | | |
| N-soya-1,3-trimethylene diamine | 5.0 | 100 | 100 | 100 | 6.4 | 10.0 |
| | 1.0 | 20 | 100 | 100 | | |
| | 0.1 | 2 | 100 | 0.0 | | |
| | 0.05 | 1 | 100 | 0.0 | | |
| N-tallow-1,3-trimethylene diamine | 5.0 | 100 | 100 | 100 | 6.4 | 10.0 |
| | 1.0 | 20 | 100 | 100 | | |
| | 0.1 | 2 | 100 | 0.0 | | |
| | 0.05 | 1 | 100 | 0.0 | | |

[1] Chemical Specialties Manufacturer's Association rearing method in Blue Book of Soap and Chemical Specialties, 1955, page 250.

EXAMPLE II

The amine was evaluated for larvicidal properties against *Culex pipiens* mosquito larvae with the following results:

TABLE IV

| Hours | 10 p.p.m. of— | | | | | | | | | |
|---|---|---|---|---|---|---|---|---|---|---|
| | 2nd instar | | | | | 4th instar | | | | |
| | 2 | 4 | 8 | 24 | 48 | 2 | 4 | 8 | 24 | 48 |
| N-secondary-($C_{11}$-$C_{18}$) alkyl-1,3 trimethylene diamine | 75 | 90 | 100 | 100 | 100 | 0 | 0 | 20 | 90 | 100 |
| N-tallow-1,3 trimethylene diamine | 30 | 75 | 100 | 100 | 100 | 0 | 0 | 0 | 85 | 100 |

TABLE V

| Hours | 1 p.p.m. of— | | | | | | | | | |
|---|---|---|---|---|---|---|---|---|---|---|
| | 2nd instar | | | | | 4th instar | | | | |
| | 2 | 4 | 8 | 24 | 48 | 2 | 4 | 8 | 24 | 48 |
| N-secondary-($C_{11}$-$C_{18}$) alkyl-1,3-trimethylene | 0 | 40 | 50 | 60 | 70 | 0 | 0 | 0 | 0 | 20 |
| N-tallow-1,3-trimethylene diamine | 0 | 35 | 50 | 50 | 50 | 0 | 0 | 0 | 0 | 0 |

| | Concentration, percent | Kill, percent | Time to kill, minutes |
|---|---|---|---|
| N-(2-cyanoethyl)-dodecylamine | 0.1 | 100 | 20 |
| | 0.05 | 100 | 20 |
| | 0.01 | 98.8 | 20 |

EXAMPLE III

N-coco - 1,3 - trimethylene diamine was compared with certain known insecticides-larvicides for minimum effective concentration for 100% kill within 48 hours on from 20 to 30 fourth-instar mosquito larvae (*Aedes aegypti*). The following results were obtained:

| Compound: | Concentration, p.p.m. |
|---|---|
| N-coco - 1,3 - trimethylene diamine | 0.1 |
| Parathion (diethylnitrophenyl thiophosphate) | 0.01 |
| DDT | 0.1 |
| Aldrin (hexachlorohexahydroendoexodimethanonaphthalene) | 0.1 |
| Endric (hexachloroepoxyoctahydroendoendodimethanonaphthalene) | 0.1 |
| Dieldrin (hexachlorooctahydrodimethanonaphthalene) | 0.1 |
| Heptachlor (heptachlorotetrahydromethanoindene) | 0.1 |
| Toxaphene (chlorinated camphene) | 1.0 |
| Chlordane (octachlorohexahydromethanoindene) | 1.0 |

EXAMPLE IV

Diamines were evaluated for toxicity to mosquito larvae (*Aedes aegypti*). Second and fourth instar larvae were exposed to 1 p.p.m. and 10 p.p.m. concentrations of the chemicals and the percent kill of the larvae after 2, 4, 8, 24 and 48 hours exposure was observed. The results at 10 p.p.m. concentration are set forth in Table IV and the results at 1 p.p.m. are set forth in Table V.

While in the foregoing specification, I have set forth specific insect larvicide compositions in considerable detail for the purpose of illustrating embodiments of my invention, those skilled in the art will appreciate that variations can be made without departing from the spirit and scope of my invention; and therefore, it is not intended to be limited except as indicated in the appended claims.

What is claimed is:

1. A method of killing mosquito larvae by applying to larvae-infested areas an effective amount of at least 0.1 part by weight of N-(-2 cyanoethyl) dodecylamine per million parts of carrier.

2. The method of claim 1 wherein the concentration of the N-(2-cyanoethyl) dedecylamine is from 0.1 to 500 parts per million by weight of the carrier.

3. A method of killing mosquito larvae by applying to larvae-infested areas an effective amount of at least 0.1 part by weight of N-tallow 1,3-trimethylene diamine per million parts of carrier.

4. The method of claim 3 wherein the concentration of the N-tallow 1,3-trimethylene diamine is from 0.1 to 500 parts per million by weight of the carrier.

References Cited
UNITED STATES PATENTS

| 2,433,525 | 12/1947 | Morey | 260—583 PX |
| 2,267,204 | 12/1941 | Kyrides | 260—583 PX |
| 2,030,093 | 2/1936 | Bousquet et al. | 424—304 |
| 2,204,511 | 6/1940 | Ralston et al. | 424—325 |
| 2,246,524 | 6/1941 | Kyrides | 424—65 |
| 2,307,775 | 1/1943 | Flenner et al. | 424—233 |
| 3,386,881 | 6/1968 | Abramitis | 424—325 |

SAM ROSEN, Primary Examiner

U.S. Cl. X.R.

424—325